United States Patent [19]

Titcombe et al.

[11] Patent Number: 4,707,566

[45] Date of Patent: Nov. 17, 1987

[54] ELECTRICAL CRIMP CONNECTION

[75] Inventors: Ian R. A. Titcombe, Swindon; Ian A. Strange, Bristol, both of England

[73] Assignee: Raychem Limited, Swindon, England

[21] Appl. No.: 885,999

[22] Filed: Jul. 15, 1986

[30] Foreign Application Priority Data

Jul. 18, 1985 [GB] United Kingdom ................. 8518141

[51] Int. Cl.⁴ ........................ H01R 4/10; H02G 15/02

[52] U.S. Cl. ........................................ 174/78; 29/863; 174/84 C; 439/877

[58] Field of Search .................. 339/223, 276; 174/78, 174/88 C, 102 C, 84 C, 74 R, 76 R, DIG. 7; 29/861-863; 439/730, 865-868, 877-882

[56] References Cited

U.S. PATENT DOCUMENTS 3,200,190 8/1965 Forney ........................ 174/84 C X 3,347,977 10/1967 Hus et al. .......................... 174/74 R 3,517,112 6/1970 Wahl ............................ 174/84 C X

*Primary Examiner*—Eugene F. Desmond

*Attorney, Agent, or Firm*—Dennis Kovach; Herbert Burkard

[57] ABSTRACT

An electrical connection to an insulated wire having a conductor that is softer than the wire insulation, for example a piezoelectric vinylidine fluoride polymer wire having a low melting point conductor, comprises a conductive crimping element that is crimped onto the wire. The crimping element has been deformed to a relatively small extent such that it does not penetrate the wire insulation but causes the low melting point metal conductor to exude out of the wire into contact on the electrically conductive connection element, e.g. the closed end of the crimp.

21 Claims, 5 Drawing Figures

ELECTRICAL CRIMP CONNECTION

The present invention relates to electrical connections to insulated wires, and especially to electrical crimp connections to such wires.

The use of crimp connectors for forming connections to electrical wires is well established and such connectors have been used for many years. If the connection is to be formed to an insulated wire, the usual practice is either to strip a portion of the insulation off the wire to expose the conductor and to form a crimp connection directly onto the exposed conductor, or to form an "insulation displacement" type of connection in which a connector optionally having an appropriately profiled internal surface, is positioned on an insulated portion of the wire, and part of the connector is forced through the insulation, thereby displacing part of the insulation, into electrical contact with the conductor.

In general such methods are quite adequate for forming electrical connections to a wide range of insulated wires. However, recently one form of insulated wire has been proposed in which the insulated electrical conductor is formed from a material that is softer than the insulation covering it. The electrical conductor may be formed, for example, from a low melting point metal alloy (the term "low melting point" in this context meaning that the melting point of the conductor is lower than the melting or softening point of the insulation), or it may be formed from a conductive particle filled polymer. Examples of electrical wires or coaxial cables that employ low melting point conductors are described in British Patent Applications Nos. 2,150,345A and 2,150,346A, the disclosures of which are incorporated herein by reference. The coaxial cables described therein have a piezoelectric dielectric formed from a relatively crystalline vinylidine fluoride polymer, and a central conductor that is formed from a low melting point metal alloy in order to allow the dielectric to be oriented during manufacture of the cable. Because of the nature of the materials involved it is impossible, or at least very difficult, to strip the dielectric from the central conductor, so that the insulation displacement type of connection has been used. However, such connections have been found to be unrealiable: although a good connection appears to have been found initially, after a period of time faults may appear, for example a short circuit may be formed between the inner and outer conductor.

According to one aspect, the present invention provides an electrical connection to an insulated wire having a conductor that is softer than the wire insulation, which comprises an electrically conductive crimp element that is located on an insulated portion of the wire and crimped thereon, the crimping element having been deformed to such an extent that it does not penetrate the insulation but that it causes the conductor to exude along a predetermined path in the insulation into electrical contact with an electrically conductive connection element.

According to another aspect, the invention provides a method of forming an electrical connection to an insulated wire having a conductor that is softer than the wire insulation, which comprises positioning a crimping element on an insulated portion of the wire, and crimping it on to the wire, the crimping element being deformed by the crimping operation to such an extent that it does not penetrate the insulation but that it causes the conductor to exude along a predetermined path in the insulation into electrical contact with an electrically conductive connection element.

By the term "softer" when describing the wire conductor is meant that the conductor has a lower yield stress than that of the wire insulation, or of the dielectric of a coaxial cable. The conductor preferably, but not necessarily, also has a higher ultimate elongation than that of the wire insulation or dielectric.

It is possible in some circumstances for the crimping element to cause the conductor to exude along a predetermined path through the wall of the insulation if the crimping element is arranged to form a line of weakness through the insulation, for example by providing it with one or more internal protuberances. Preferably, however, the crimping element, which may for example be in the form of a ferrule, is located on an end portion of the insulated wire and is deformed to cause the conductor to exude from the end of the wire into electrical contact with the connection element.

It is preferred for the crimping element to be deformed to such an extent that the underlying wire insulation is not deformed beyond its ultimate elongation and so therefore remains intact along the length of the wire, and preferably is not deformed beyond its yield point. It is believed that failures associated with previous proposals for connecting such wires were caused by the formation of cracks in the wire insulation due to the crimping force, which cracks could extend to the outer conductor or other conductive elements in the arrangement and allow the insulated conductor to exude along the cracks into contact with the outer conductor or other conductive elements. The extent to which the crimping element can be deformed will depend at least partly on the nature of the wire insulation. For example, in the case of insulation based on polyvinylidine fluoride it is preferred for the diameter of the deformed portions of the crimping element to be not less than 0.6, and especially not less than 0.8 times the outer diameter of the wire insulation. Alternatively or in addition, the local deformation of the wire insulation at points on the insulation can be reduced if the crimping element is indented in at least 2, preferably at least 3 and especially at least 4 directions arranged around its circumference.

The electrically conductive connection element may be electrically connected to, or electrically isolated from, the crimping element, depending on the circumstances. For relatively simple connections to insulated primary wires the electrically conductive connection element may be connected to, and may form part of, the crimping element. For example, the crimping element may be in the form of a ferrule having one open and one closed end, the closed end of the ferrule forming the electrically conductive connection element.

As mentioned above, the connection and the method according to the invention may be used for forming electrical connections to coaxial cables where, for example, the wire insulation forms the dielectric of the cable, and the cable has an outer conductor around the dielectric. In this case the electrically conductive connection element may form part of the crimping element in which case at least a portion of the outer conductor is removed from the dielectric in the region of the cable on which the crimping element is located, and another portion of the outer conductor is electrically connected to a further electrical connection element, for example a second crimping element. If the further electrical connection element is mechanically connected to, but electrically insulated from, the crimping element, the two elements may be provided as a one-piece connector that can be positioned on an appropriately stripped coaxial cable and crimped thereon, preferably in a single operation, to form the connection. An alternative and preferred connection for coaxial cables, however, is one in which the electrically conductive connecting element is electrically isolated from the crimping element, and the crimping element forms the further electrical connection element, the crimping element being located on part of the outer conductor of the coaxial cable. This form of connector has the advantage that it does not require any of the outer conductor of the coaxial cable to be removed, and that connections to both the inner and the outer conductor can be formed simultaneously by a single crimping operation. Thus, according to yet another aspect, the invention provides an electrical connector for forming an electrical connection to a coaxial cable that has a central conductor that is softer than the cable dielectric, the connector comprising a hollow electrically conductive crimping element for receiving an end portion of the coaxial cable and for forming an electrical connection to the outer conductor of the coaxial cable, and an electrically conductive element for forming an electrical connection to the central conductor of the coaxial cable, the electrically conductive element being electrically isolated from the crimping element and arranged in the connector so that it is located at the end of the coaxial cable when the end portion of the coaxial cable is inserted into the crimping element and so that it contacts the central conductor that exudes from the end of the coaxial cable when the crimping element is crimped about the end portion of the coaxial cable.

The electrically conductive elements that form electrical connections with the wire conductor or with the coaxial cable conductors may have any configuration appropriate to the type of connector that is desired. Thus the elements may provide, or lead to, terminals for connecting primary wires, or they may provide, or lead to, the terminals of a coaxial connector, for example a BNC type connector. Many other connector configurations will be apparent to those skilled in the art.

Methods of forming electrical connections, electrical connections so formed, and devices for forming such connections in accordance with the invention will now be described by way of example with reference to the accompanying drawings in which.

Figure 1:
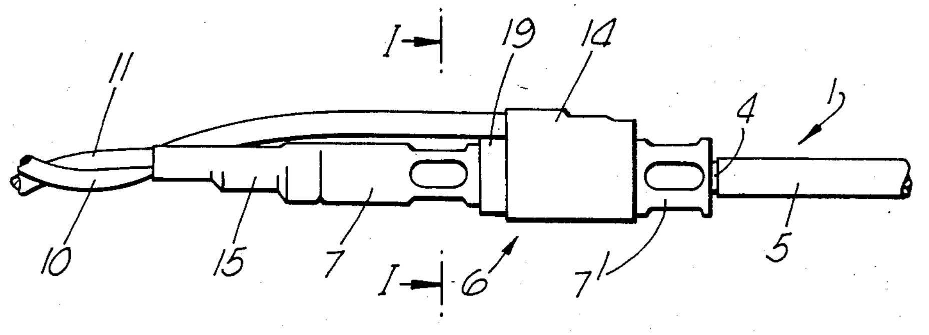
FIG. 1 is a side view of an electrical connection according to the invention.
Figure 2:
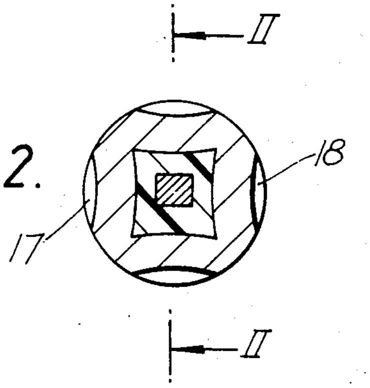
FIG. 2 is a section along the line I—I of figure 1.
Figure 3:
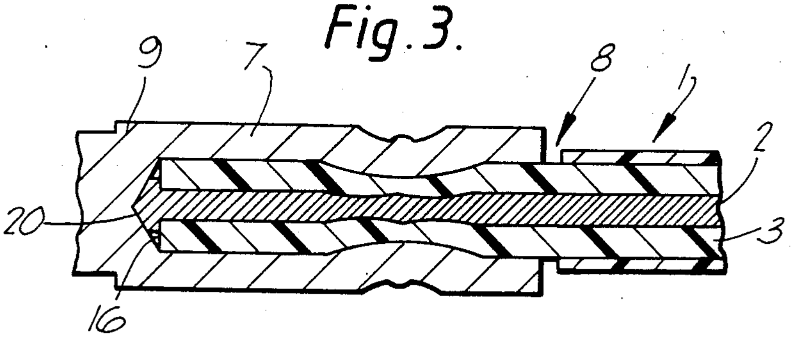
FIG. 3 is a section along the line II—II of FIG. 2.

Referring initially to FIGS. 1 to 3 of the accompanying drawings a piezoelectric coaxial cable 1 as described in British Patent Application No. 2,150,345A comprises a central conductor 2 formed from a Sn Cd alloy, a 0.5 mm thick piezoelectric polyvinylidine fluoride dielectric 3, a silver paint outer conductor 4 and a polymeric jacket 5. The polymeric jacket 5 is cut back to expose about 1.5 cm of the outer conductor and about 0.7 cm of the outer conductor is removed to expose the dielectric.

A one-piece electrical connector 6 comprises a first crimp ferrule 7 having an open end 8 and a closed end 9, for forming a connection to the central conductor of the coaxial cable, and a second crimp ferrule 7' for forming a connection to the outer conductor of the cable, the two crimp ferrules being mechanically joined by means of an insulating plastics connection piece 19. Each crimp ferrule is connected to an electrical wire 10,11 by means of a solder joint insulated in a heat shrinkable polymeric sleeve 14,15 recovered thereon.

In order to form an electrical connection, the connector 6 is slipped over the end of the coaxial cable until the end 16 of the cable abuts the closed end 9 of the first crimp ferrule 7, and the second crimp ferrule lies over the outer conductor 4 of the cable. The first and second crimp ferrules are then crimped onto the cable using a four or eight pressure point crimping tool in known manner, with the exception that the crimping tool is set so that the first crimp ferrule is deformed to such an extent that the minimum internal distance between opposed pressure points 17 and 18 is at least 0.7 times the outer diameter of the dielectric 3. When the ferrule 7 is crimped, the underlying part of the dielectric is deformed radially inwardly and causes part 20 of the metallic conductor 2 of the cable to exude from the end 16 into electrical contact with the closed end 9 of the first crimp ferrule 7. If desired the connection may be provided with electrical insulation, for example by recovering a further heat shrinkable sleeve (not shown) thereon.

Figure 4:
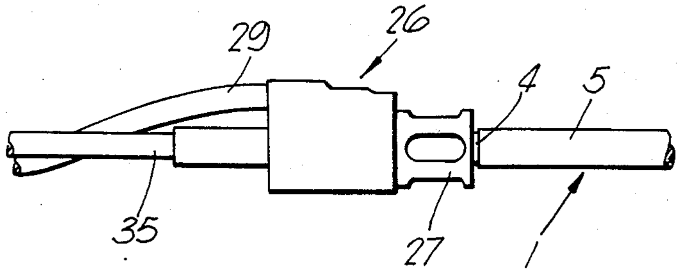
FIG. 4 is a side view of another electrical connection according to the invention.
Figure 5:
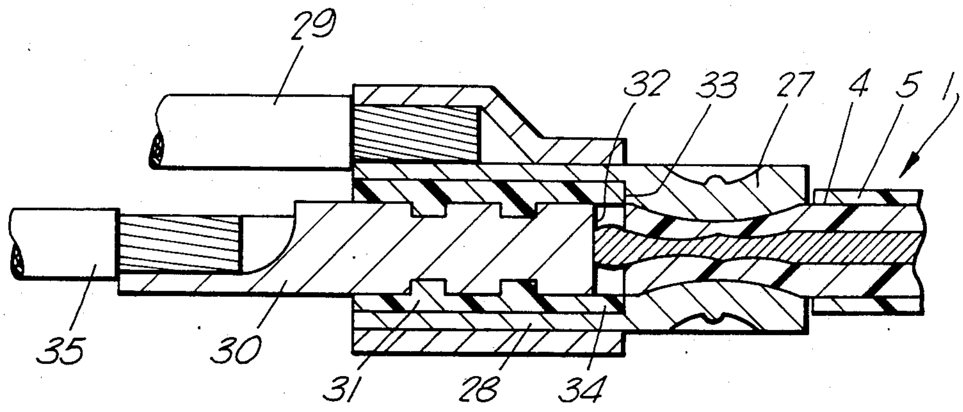
FIG. 5 is a longitudinal section through the connection of FIG. 4.

FIGS. 4 and 5 show another form of electrical connection to a coaxial cable that may be formed by means of an electrical connector in accordance with the invention.

A one-piece electrical connector 26 comprises a crimp ferrule 27 having two open ends and an annular or tubular extension 28 extending from one end thereof to which a primary wire 29 is connected in known manner e.g. by a solder connection. A metallic connection element 30 is held axially within the extension 28 and insulated therefrom by means of an annular plastics connection piece 31 so that an end face 32 of the connection element 30 is located slightly beyond one end 33 of the crimp ferrule 27, and separated from the crimp ferrule 27 by a small annular band 34 of the plastics connection piece 31. The other end of the connection element 30 is in the form of a cup to which a primary wire 35 is connected by means of another solder connection.

In order to form an electrical connection to this connector, a piezoelectric coaxial cable 1 described with reference to FIGS. 1 to 3 is prepared for connection simply by cutting back the polymeric jacket 5 while leaving the outer conductor 4 intact along the length of the cable. The end portion of the cable 1 is then inserted into the crimp ferrule 27 until the end of the cable abuts the end face 32 of the connection element 30 or is separated therefrom by only a small distance, and the crimp ferrule is crimped onto the coaxial cable using an eight pressure point (four directions) crimping tool as described above. The pressure of the crimping operation simultaneously forms a connection between the outer conductor 4 and the crimp ferrule 27 and causes the metal central conductor 2 of the coaxial cable to exude from the end of the coaxial cable into electrical contact with the end face 32 of the connection element 30.

EXAMPLE

A connector as described with respect to FIG. 1 was subjected to temperature cycling in accordance with BS 4G178 for 100 cycles in which the temperature was varied between ambient temperature and 70° C. The mean contact resistances between the crimps and the conductors together with the mean pull-out force are shown in the table.

TABLE

| | resistance (mohm) | | |
|---|---|---|---|
| | before cycling | after cycling | Pull out force (N) |
| Inner Crimp | 300 | 360 | 150 |
| Outer Crimp | 280 | 140 | 280 |

We claim:

1. An electrical connection to an insulated wire having a conductor that is softer than the wire insulation, comprising:
   an electrically conductive connection element;
   a crimping element located around a circumference of the wire and crimped thereon, the crimping element having been deformed to such an extent that it does not penetrate the insulation and has caused the conductor to exude from a position electrically isolated from the connection element to a position in electrical contact with the connection element.

2. A connection as claimed in claim 1, wherein the crimping element is in the form of a ferrule and is located on an end portion of the wire.

3. A connection as claimed in claim 1, wherein the crimping element has been deformed to such an extent that the wire insulation is not deformed beyond its yield point.

4. A connection as claimed in claim 1, wherein the crimping element is in the form of a ferrule and has been deformed by pressure applied to at least three points about its circumference.

5. A connection as claimed in claim 1, the crimping element having been deformed to cause the conductor to exude from an end of the wire and into electrical contact with an end of the connection element.

6. A connection as claimed in claim 1, wherein the wire conductor is metallic.

7. A connection as claimed in claim 6, wherein the wire insulation is formed from a piezoelectric material.

8. A connection as claimed in claim 1, wherein the wire insulation comprises a vinylidine fluoride polymer.

9. A connection as claimed in claim 8, wherein the wire insulation comprises polyvinylidine fluoride.

10. A connection as claimed in claim 1, wherein the electrically conductive connection element forms part of the crimping element.

11. A connection as claimed in claim 10, wherein the crimping element is in the form of a ferrule having one open end and one closed end, the closed end of the ferrule forming the electrically conductive connection element.

12. A connection as claimed in claim 1, wherein the insulated wire is a coaxial cable and the wire insulation forms the dielectric of the cable, the cable having an outer conductor around the dielectric that is electrically connected to a further electrical connection element.

13. A connection as claimed in claim 12, wherein the electrically conductive connection element is electrically isolated from the crimping element, and the crimping element forms the further electrical connection element, the crimping element being located on part of the outer conductor of the coaxial cable.

14. A connection as claimed in claim 12, wherein the electrically conductive connection element forms part of the crimping element, and at least a portion of the outer conductor has been removed from the dielectric in the region of the cable on which the crimping element is located.

15. A connection as claimed in claim 14, wherein the further electrical connection element is mechanically connected to, but electrically insulated from, the crimping element.

16. A method of forming an electrical connection to an insulated wire having wire insulation and a conductor that is softer than the wire insulation, comprising the steps of:
   positioning a crimping element around the wire; and
   crimping the crimping element onto the wire to such an extent that it does not penetrate the insulation and causes the conductor to exude from a position electrically isolated from the connection element to a position in electrical contact with an electrically conductive connection element.

17. An electrical connector for forming an electrical connection to a coaxial cable that has a central conductor that is softer than the cable dielectric, the connection comprising:
   an electrically conductive connection element; a hollow electrically conductive crimping element for receiving an end portion of the coaxial cable and for forming an electrical connection to an outer conductor of the coaxial cable, the crimping element having being deformed to such an extent that it causes the conductor to exude from a position electrically isolated from the connection element to a position in electrical contact with the connection element.

18. A connector as claimed in claim 17, wherein the electrically conductive element forms a stop for determining the extent of insertion of the coaxial cable in the crimping element.

19. A connector as claimed in claim 18, wherein the electrically conductive element has a surface that abuts the end of the coaxial cable when the coaxial cable is inserted into the crimping element.

20. A connector as claimed in claim 18, wherein the crimping element is in the form of a ferrule and holds the electrically conductive element in a part thereof by means of an electrically insulating element.

21. A connector as claimed in claim 18, further comprising means for electrically isolating the conductive element from the crimping element, the conductive element being arranged in the connector so that it is located at the end portion of the coaxial cable, crimping of the crimping element causing the central conductor to exude axially from the end portion of the coaxial cable and into contact with an end of the conductive element.

* * * * *